United States Patent [19]
Bernard et al.

[11] Patent Number: 4,508,563
[45] Date of Patent: Apr. 2, 1985

[54] REDUCING THE OXYGEN CONTENT OF TANTALUM

[75] Inventors: Walter J. Bernard; Richard J. Millard, both of Williamstown, Mass.

[73] Assignee: Sprague Electric Company, North Adams, Mass.

[21] Appl. No.: 591,293

[22] Filed: Mar. 19, 1984

[51] Int. Cl.$^3$ .............................................. B22F 9/00
[52] U.S. Cl. ................................................ 75/0.5 BB
[58] Field of Search ..................... 75/0.5 AB, 0.5 BB

[56] References Cited

U.S. PATENT DOCUMENTS 3,169,862  2/1965  Scheller ................................. 75/207
3,415,639  12/1968  Daendlikev et al. ............ 75/0.5 BB
3,697,255  10/1972  Baldwin et al. ................. 75/0.5 BB
4,231,790  11/1980  Hähn et al. ....................... 75/0.5 BB

FOREIGN PATENT DOCUMENTS 492060   9/1938  United Kingdom .
933971   8/1963  United Kingdom .
1123015  8/1968  United Kingdom .

Primary Examiner—W. Stallard

[57] ABSTRACT

The oxygen content of tantalum is reduced by intimately contacting the tantalum with an alkali metal halide, reacting them in a non-oxidizing atmosphere at a maximum temperature of 1200° C. to form and expel the tantalum halide and alkali metal oxide formed by the reaction, and then raising the temperature to 1400° C. for no longer than 10 min. to volatilize any excess alkali metal halide. The tantalum may be in the form of a powder or a porous sintered pellet, and an improved product for electrolytic capacitors, with lower leakage current, is obtained.

16 Claims, No Drawings

REDUCING THE OXYGEN CONTENT OF TANTALUM

BACKGROUND OF THE INVENTION

This invention concerns a process for reducing the oxygen content of tantalum for high CV electrolytic capacitors. It involves intimately contacting an alkali metal halide with the tantalum, reacting these substances in a non-oxidizing atmosphere at a maximum temperature of 1200° C. to form and expel the resulting tantalum halide and alkali metal oxide, and then increasing the temperature to 1400° C. for no longer than 10 min to expel any excess alkali metal halide.

For electrolytic capacitors, the oxygen concentration in the tantalum is critical. When the total oxygen content of porous tantalum pellets is above 3000 ppm, capacitors made from such pellets may have unsatisfactory life characteristics. Unfortunately tantalum powder has a great affinity for oxygen, and thus the processing steps which involve heating and subsequent exposure to air inevitably results in an increasing concentration of oxygen. Since the amount of oxygen absorbed will be proportional to the surface area exposed, fine powders with very high CV properties are even more susceptible to the reaction with atmospheric oxygen. The electrical properties of these powders would be improved if the oxygen content were reduced before processing as capacitor anodes.

Alkaline earth metals, aluminum, yttrium, carbon, and tantalum carbide have all been used to deoxygenate tantalum, but there are certain disadvantages to their employment. The alkaline earth metals, aluminum, and yttrium form refractory oxides which must be removed, e.g., by acid leaching, before the material is suitable for capacitors. The amount of carbon must be carefully controlled since residual carbon is also deleterious to capacitors even at levels as low as 50 ppm. Still other methods which have been proposed involve using a thiocyanate treatment or a hydrocarbon or reducing atmosphere during some of the tantalum processing stages to prevent oxidation and thus keep the oxygen content low.

SUMMARY OF THE INVENTION

It is a feature of this invention to provide a process by which the oxygen content of tantalum, in either powder or pelleted form, is reduced to produce a high CV product suitable for electrolytic capacitors. The process involves intimately contacting tantalum with an alkali metal halde, reacting them in a non-oxidizing atmosphere at a temperature of at most 1200° C. to form a tantalum halide and alkali metal oxide and volatilize and expel them, and then increasing the temperature to at most 1400° C. for at most 10 min to volatilize and expel excess unreacted alkali metal halide. Preferably, at least the second part of the reaction cycle is carried out under reduced pressure to ensure volatilization of the alkali metal halide. Any tantalum halide or alkali metal oxide not expelled in the first part of the reaction will be removed there. The overall reaction is:

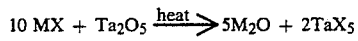

where M is an alkali metal and X is a halide.

Both products of the above reaction are more volatile than the starting materials, and the reaction proceeds to the right removing the thin oxide layer from the surface of the tantalum powder or pellets. As is customary, an excess of alkali metal halide over the stoichiometric amount shown above will be used.

The alkali metal halides are preferred over other halides which form volatile oxides and are relatively volatile themselves, e.g., transition metals, as some of these are poisonous or might be detrimental to capacitor operation. Alkali metal halides are completely volatile below 1400° C. under vacuum. They do not react with or dissolve in the tantalum metal but remain on the metal surface until volatilized.

Since the object is to remove unwanted oxide, the reaction must take place in an atmosphere which is substantially free of oxygen, e.g., in an inert gas or in a vacuum. The reaction temperature and time in the first part of the reaction depends on particular alkali metal halide used, but it is at most 1200° C. and may be as low as 350° C., the boiling point of potassium oxide, the lowest boiling alkali metal oxide. The preferred alkali metals are sodium, potassium, and lithium; while ribidium and cesium halides are lower melting and lower boiling, these salts are quite expensive. In the second part of the reaction, the reduction temperature is increased to a maximum of 1400° C. for at most 10 min and, if the reaction has not been carried out under reduced pressure, the reaction vessel pressure is then reduced to ensure complete volatilization and removal of unreacted alkali metal halide and residual products.

DESCRIPTION OF THE PREFERRED EMBODIMENTS

High CV tantalum powders or pellets pressed from such powders are treated to reduce the oxygen content and obtain a high CV product suitable for capacitors by first intimately mixing the tantalum with an alkali metal halide. The mixture is then reacted first at a maximum temperature of 1200° C. in a non-oxidizing atmosphere, e.g., an inert atmosphere or under vacuum, to react with the thin tantalum oxide layer on the tantalum surfaces to form the corresponding alkali metal oxide and tantalum halide. If the reaction is being carried out under vacuum, these reaction products will be at least partially removed from the reaction chamber.

Then the temperature is raised to 1400° C. for at most 10 min. If the reaction has not been carried out under vacuum, the pressure is reduced now to about $10^{-5}$ torr or less to ensure removal of the reaction products and unreacted alkali metal halide.

The upper limit of the reaction and "finishing" temperatures are critical. Above about 1200° C., tantalum oxide solubility in the tantalum matrix becomes too high to make it available for reaction with the halide and removal. Above about 1400° C., the finishing temperature, the tantalum grain growth and sintering reaction causes a loss of surface area and, hence, capacitance.

When the tantalum to be treated is in the form of a powder, the powder and alkali metal halide are intimately contacted, preferably by dry blending and then reacted as described above. The reaction may take place before the steps of agglomeration of the powder, pellet manufacture, and sintering, since the oxygen content is reduced sufficiently by the treatment to keep the total oxygen within the necessary limits for a high CV product.

However, it is preferred to treat the tantalum in the form of porous pellets after they have been sintered.

The pellets and alkali metal halide are intimately contacted by impregnating the pellets with an aqueous solution of the alkali metal halide, drying the impregnated pellets at about 110° C. for 10 to 60 min to remove water, and then reacting as above to remove oxygen. The utility of the present invention is shown in the following example.

EXAMPLE 1

Porous pellets were made from two commercial fine particle-size, high CV powders. The pellets were sintered, and one lot from each powder was anodized to 70 V and a second lot to 100 V. Pellets from powder A had a leakage current of $13.6 \times 10^{-4}$ and $13.2 \times 10^{-4}$ $\mu A/\mu FV$, for 70 V and 100 V formation, respectively, and contained 34 ppm carbon and 3650 ppm oxygen. The corresponding values for pellets made from powder B were $17.1 \times 10^{-4}$ and $17.4 \times 10^{-4}$ $\mu A/\mu FV$, 28 ppm carbon and 3760 ppm oxygen. The first two lots of pellets were reacted using a vacuum of $10^{-5}$ torr in the chamber throughout the process.

The third lot was reacted under a helium partial pressure of 60 torr, and the pressure was reduced to $10^{-5}$ torr before the temperature was raised to the finishing temperature.

In lot number 1, the test pellets were impregnated with a 30% aqueous solution of potassium fluoride, dried and then reacted by heating to 1200° C. and holding there for 15 min and then raising the temperature to 1400° C. and holding there for 2 min. The controls were not treated with the halide solution but were subjected to the reaction temperatures. The results are shown below. The leakage current is expressed in $\mu A/\mu FV \times 10^{-4}$, oxygen and carbon in ppm, and change in oxygen and carbon content in ppm. Leakage currents were measured at 70% of the formation voltage.

TABLE 1a

| Pellets | Leakage Current | | C | ΔC | O | ΔO |
|---|---|---|---|---|---|---|
| | 70V | 100V | | | | |
| A - Control | 20.4 | 21.4 | 35 | | 3990 | |
| A - Expt'l | 7.7 | 7.7 | 53 | +18 | 3380 | −610 |
| B - Control | 22.5 | 22.5 | 25 | | 4160 | |
| B - Expt'l | 11.5 | 13.0 | 36 | +11 | 3450 | −710 |

The results show that both leakage current and oxygen content were reduced by the treatment.

In lot number 2, pellets made from powder A were treated with an aqueous 48% solution of potassium fluoride and then reacted at 550° C. for 3 hrs after which the temperature was raised to 1200° C. and held there for 10 min. The results are shown below.

TABLE 1b

| | Leakage Current | | C | ΔC | O | ΔO |
|---|---|---|---|---|---|---|
| | 70V | 100V | | | | |
| Control | 23.1 | 23.9 | 33 | | 4190 | |
| Expt'l | 7.3 | 8.8 | 43 | +10 | 3100 | −1090 |

Again leakage current and oxygen contents were reduced.

Lot number 3 pellets from powder B were treated similarly except that the reaction was carried out under a helium partial pressure of 60 torr at 700° C. for 2 hours and then the temperature was raised to 1400° C. at a pressure of $10^{-5}$ torr and held there for 15 min. The results are given below.

TABLE 1c

| | Leakage Current | | C | ΔC | O | ΔO |
|---|---|---|---|---|---|---|
| | 70V | 100V | | | | |
| Control | 29.9 | 30.0 | 18 | | 4400 | |
| Expt'l | 14.0 | 18.6 | 18 | 0 | 3580 | −860 |

As can be seen from the data, the process of the present invention can be used to reduce the oxygen content of tantalum for electrolytic capacitors. Other alkali metal halides may be used; however, potassium fluoride is preferred for pellet impregnation because of its high solubility in water.

The temperature, degree of vacuum (preferably $10^{-4}$ to $10^{-5}$ torr) or partial pressure of non-oxidizing atmosphere, and length of treatment time in the first stage are so chosen that the products of the reaction are completely volatilized while the alkali metal halide reactant is not volatilized. This balance ensures that the alkali metal halide will persist in the reaction zone to react with the tantalum oxide and that the products will be removed, forcing the reaction to completion. Experiments showed that the residence time in the second stage should not exceed 10 min in order to retain high surface area and high capacitance.

What is claimed is:

1. A process for reducing the oxygen content of tantalum to obtain a high CV product for electrolytic capacitors comprising intimately contacting said tantalum with an alkali metal halide, reacting said metal halide with said tantalum oxide out of contact with an oxygenated medium at a temperature of at most 1200° C. to form a corresponding alkali metal oxide, and then increasing said temperature to at most 1400° C. for at most 10 minutes to volatilize and expel any excess alkali metal halide.

2. A process according to claim 1 wherein said tantalum is in the form of powder particles having a thin oxide coating.

3. A process according to claim 2 wherein said intimate contacting is dry mixing.

4. A process according to claim 2 wherein said reacting is carried out prior to agglomerating said powder.

5. A process according to claim 1 wherein said tantalum is in the form of a sintered porous pellet.

6. A process according to claim 5 wherein said intimate contacting comprises impregnating said pellet with an aqueous solution of said metal halide.

7. A process according to claim 6 wherein said impregnated pellet is dried at up to 110° C. and for up to 60 minutes prior to said reacting step.

8. A process according to claim 1 wherein said reacting is carried out at least at 350° C.

9. A process according to claim 1 wherein said alkali metal halide is selected from the group consisting of bromide, chloride, and fluoride of sodium, potassium, lithium, cesium, and rubidium.

10. A process according to claim 9 wherein said alkali metal halide is a sodium, potassium, or lithium halide.

11. A process according to claim 9 wherein said halide is potassium fluoride.

12. A process according to claim 1 wherein said reacting is carried out in an inert atmosphere.

13. A process according to claim 12 wherein said inert atmosphere is helium.

14. A process according to claim 1 wherein said reacting is carried out under a vacuum.

15. A process according to claim 1 wherein said volatilizing of said alkali metal halide is carried out in a vacuum.

16. A process according to claim 15 wherein said pressure is reduced to approximately $10^{-5}$ torr.

* * * * *